United States Patent
Nakajima

(10) Patent No.: US 9,614,636 B2
(45) Date of Patent: Apr. 4, 2017

(54) RECEIVER OPTICAL MODULE FOR WAVELENGTH MULTIPLEXED SIGNAL

(71) Applicant: Sumitomo Electric Industries, Ltd., Osaka-shi (JP)

(72) Inventor: Fumihiro Nakajima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 90 days.

(21) Appl. No.: 14/465,658

(22) Filed: Aug. 21, 2014

(65) Prior Publication Data

US 2015/0055665 A1 Feb. 26, 2015

(30) Foreign Application Priority Data

Aug. 23, 2013 (JP) .................................. 2013-173396
Dec. 3, 2013 (JP) .................................. 2013-249981

(51) Int. Cl.
*H04B 10/67* (2013.01)
*H04J 14/02* (2006.01)
*G02B 6/42* (2006.01)

(52) U.S. Cl.
CPC ............ *H04J 14/02* (2013.01); *G02B 6/4214* (2013.01); *G02B 6/4215* (2013.01); *H04B 10/671* (2013.01); *H04B 10/675* (2013.01); *H04J 14/0213* (2013.01); *G02B 6/421* (2013.01); *G02B 6/4267* (2013.01)

(58) Field of Classification Search
CPC ........................... H04B 10/675; H04J 14/0213
See application file for complete search history.

(56) References Cited

U.S. PATENT DOCUMENTS

| 6,212,312 B1 | 4/2001 | Grann et al. |
| 6,636,658 B2 * | 10/2003 | Goodman ............ G02B 6/2713 385/24 |
| 2005/0025483 A1 * | 2/2005 | Gurevich ............... H04B 10/40 398/68 |
| 2006/0078252 A1 | 4/2006 | Panotopoulos |

(Continued)

FOREIGN PATENT DOCUMENTS

| CN | 102132183 A | 7/2011 |
| CN | 102340367 A | 2/2012 |

(Continued)

OTHER PUBLICATIONS

Notification of the First Office Action in counterpart Chinese Patent Application No. 201410418396.1, dated Sep. 30, 2016.

*Primary Examiner* — Nathan Curs
(74) *Attorney, Agent, or Firm* — Venable LLP; Michael A. Sartori; Laura G. Remus

(57) ABSTRACT

A receiver optical module that receives a wavelength multiplexed signal is disclosed. The receiver optical module includes an optical de-multiplexer that generates a plurality of signals contained in the wavelength multiplexed signal depending on wavelengths of the signals. The wavelength de-multiplexer has features that the optical de-multiplexer has a plurality of sub-elements stacked to each other, where each of the sub-elements de-multiplexes a portion of the wavelength multiplexed signal. Or, the optical de-multiplexer has a series of wavelength selective filters each extracting signal components having outermost wavelengths from signal components entering therein.

7 Claims, 11 Drawing Sheets

(56) References Cited

U.S. PATENT DOCUMENTS

| | | | | |
|---|---|---|---|---|
| 2010/0209103 | A1* | 8/2010 | Sakigawa | G02B 6/4201 398/45 |
| 2012/0012738 | A1* | 1/2012 | Shinada | G02B 6/26 250/226 |
| 2013/0121651 | A1 | 5/2013 | Takahashi et al. | |
| 2013/0343699 | A1* | 12/2013 | Margalit | G02B 6/29367 385/18 |

FOREIGN PATENT DOCUMENTS

| | | |
|---|---|---|
| CN | 102684794 A | 9/2012 |
| CN | 103235370 A | 8/2013 |
| CN | 103513338 A | 1/2014 |
| JP | 2002-040283 A | 2/2002 |
| JP | 2004-133114 A | 4/2004 |
| JP | 2007-003812 A | 1/2007 |
| JP | 2009-198576 A | 9/2009 |

\* cited by examiner

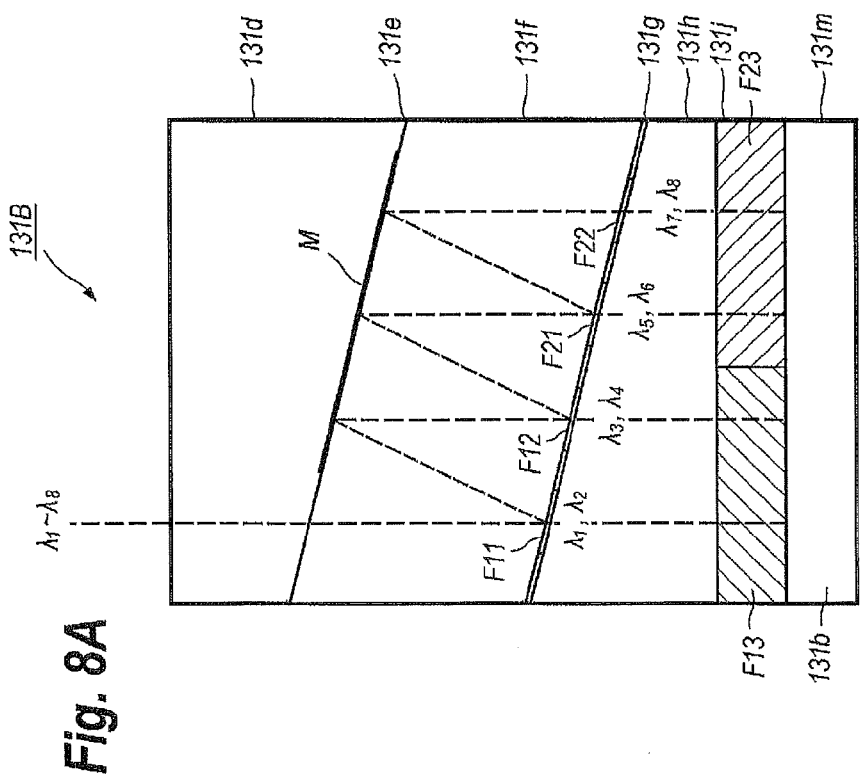

RECEIVER OPTICAL MODULE FOR WAVELENGTH MULTIPLEXED SIGNAL

TECHNICAL FIELD

The present application relates to a receiver optical module, in particular, the application relates to a receiver optical module that receives a wavelength multiplexed signal.

BACKGROUND

Data propagating on networks continuously increase the mass thereof, and the transmission speed of the network is inevitably further accelerated. Concurrently with this stream, an optical module/device implemented within the optical communication system resultantly enhances operational speed thereof. Recent receiver optical modules may operate over 40 Gbps, and sometimes requested to operate at 100 Gbps. Such high speed operation, a receiver optical module often has architecture of, what is called, the wavelength multiplexed system.

A receiver optical module applicable to the wavelength multiplexed signal installs a plurality of photo-detectors and an optical de-multiplexer to de-multiplex the wavelength multiplexed signal into respective optical signals dependent on wavelengths. Various types of optical de-multiplexers have been proposed in the field. Japanese Patent laid open Nos. JP2007-003812A, JP2002-040283A, JP2004-133114A, and JP2009-198576A have disclosed such modules to receive the wavelength multiplexed signal.

When conventional optical de-multiplexers such as disclosed in the prior arts above listed are applied to an optical signal that multiplexes eight (8) or more signal components, the number of wavelength selective filter (hereafter denoted as WSF) corresponding to the number of the signal components are required. Those WSFs have respective filter performance specific thereto, for instance, respective filters are necessary to have specific transmitting (or reflecting) performance different from others, which drastically raises a cost of the module. Moreover, continuous requests for an optical module applicable to the optical communication system are to make the size of the module in compact. One type of optical transceivers that installs a receiver optical module for the wavelength multiplexed signal has a width of only 7 mm. It would be so hard to install a receiver optical module installing a plurality of WSFs, inevitably, a widened optical de-multiplexer in such a slimed optical transceiver. The present application is to provide an optical de-multiplexer with a narrowed width even when the de-multiplexer enables to de-multiplex more than 8 signals.

SUMMARY

An aspect of the present application relates to a receiver optical module that receives a wavelength multiplexed signal containing a plurality of signal components each having a wavelength specific to the signal and different from other. The receiver optical module includes an optical de-multiplexer and a photodiodes (PDs) corresponding to respective signal components. The optical de-multiplexer of the present application comprises a plurality of sub-elements. Each of the sub-elements has an input surface, a body, and an output surface. Each of the input surfaces provides a wavelength selective filter (WSF) that belongs to the first group. Each of the bodies has a plurality of WSFs that belong to the second group. The first group of the WSFs splits the wavelength multiplexed signal into a plurality of portions toward respective bodies of the sub-elements, and respective portions of the wavelength multiplexed signal are further split by the second group of the WSFs in the bodies. A feature of the optical de-multiplexer of the present application is that each of the sub-elements provides a mirror in respective output surfaces to reflect the respective portions of the wavelength multiplexed signals split by respective bodies toward the stacking direction of the sub-elements. According to the arrangement of the optical de-multiplexer, the PDs may be arranged in an array.

Another aspect of the wavelength de-multiplexer of the present application, which de-multiplexes the wavelength multiplexed signal into n-counts of independent signals, includes an initial group of filter and $(i)_{th}$ group of filter. The initial group of the filter, which includes (n/m)-counts of the WSFs, splits the wavelength multiplexed signal into (n/m)-counts of partial wavelength multiplexed signals each containing m-counts of signals and outputs respective partial wavelength multiplexed signals.

The $(i)_{th}$ group of the filter ($1 \leq i \leq m/2$), which includes (n/m/2)-counts of WSFs each receiving (m−2i+2)-counts of the signal components output from the $(i-1)_{th}$ group of the filter, (a) splits one of signal components that has a shortest wavelength and another one of signal components that has a longest wavelength among the received (m−2i+2)-counts of the signal components toward (2×n/m)-counts of the PDs which are arranged in a row in a direction perpendicular to an axis connecting the $(i)_{th}$ group of the filter with the $(i-1)_{th}$ group of the filter, and (b) outputs rest (m−2i)-counts of the signal components towards $(i+1)_{th}$ group of the filter. According to the arrangement of the optical de-multiplexer of the embodiment, the n-counts of PDs may be arranged in row of (m/2)×(2n/m).

Still another aspect of the present application relates to an optical de-multiplexer that de-multiplexes wavelength multiplexed signal containing four (4) signal components each having wavelength, λ1 to λ4. The optical de-multiplexer includes an initial WSF and a first WSF. The initial WSF splits the four signal components into two parts, one of which contains two signal components having shorter two wavelengths, λ1 and λ2, while, another parts contains rest signal components having longer two wavelengths, λ3 and λ4. The two parts are output from the initial WSF in respective locations. The first WSF, which receives the four signal components output from the initial WSF, distinguishes two signal components having center two wavelengths from another two signal components having outermost two wavelengths.

BRIEF DESCRIPTION OF THE DRAWINGS

The foregoing and other purposes, aspects and advantages will be better understood from the following detailed description of a preferred embodiment of the invention with reference to the drawings, in which:

FIG. 8A is a plan view of still another modification of the sub-element shown in FIG. 6A, and FIG. 8B is a side view thereof;

DETAILED DESCRIPTION

Next, some embodiments of an optical receiver module according to the present invention will be described as referring to drawings. In the description of the drawings, numerals or symbols same with or similar to each other will refer to elements same with or similar to each other without duplicating explanations. However, it is to be understood that various changes and modifications may be apparent to those skilled in the art. Such changes and modifications are to be understood as included within the scope of the present invention as defined by the appended claims.

(First Embodiment)

Figure 1:
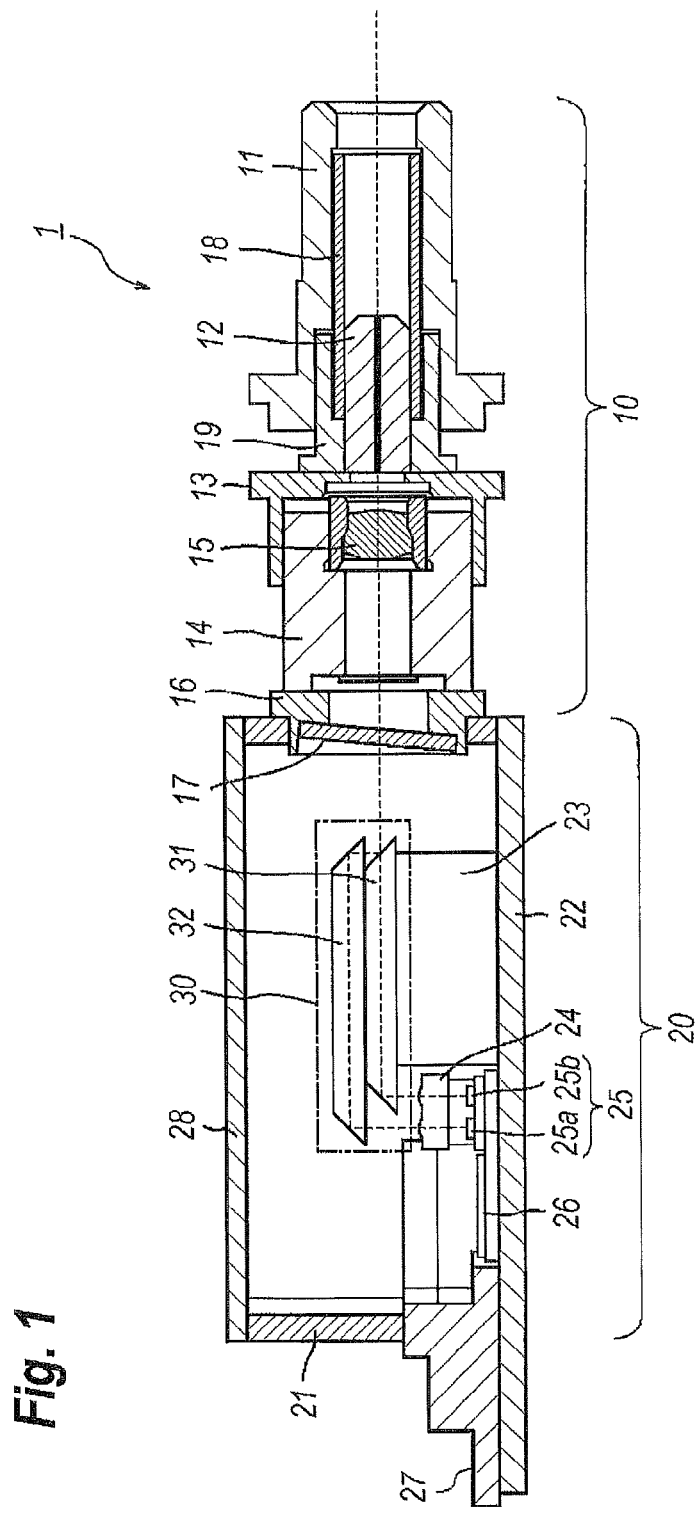
FIG. 1 is a side cross section of a receiver optical module according to an embodiment of the present invention.

FIG. 1 illustrates a side cross section of a receiver optical module according to an embodiment of the present invention. The receiver optical module 1 includes a coupling portion 10 and a body portion 20. The body portion 20 includes semiconductor optical devices 25 and optical components therein; while, the coupling portion 10 receives an external fiber therein that couples optically with the semiconductor optical devices in the body portion 20. The coupling portion 10 provides a holder 14 attached to a side of the body portion 20, a sleeve 18 covered with a sleeve cover 11, a joint sleeve 13 assembled between the holder 14 and the sleeve 18. The sleeve portion 10 further includes a stub 12 which is press-fit into a bush 19 in a root portion thereof; while, a top of the bush 19 is set within a root portion of the sleeve 18. That is, the sleeve 18 is set between the top of the stub 12 and the top of the bush 19.

The body portion 20 has a box-shaped housing 21 with a bottom 22 and a ceiling 28 each made of metal to form a space into which the optical devices 25 and the optical components are installed. The bottom 22 may be made of copper molybdenum (CuMo), copper tungsten (CuW), and the like. Metal having good thermal conductivity may be applicable to the bottom 22 to enhance the heat dissipation. The ceiling 28 air-tightly seals the space. The portion 27 in the rear end, which may be made of ceramics, provides a plurality of electrical terminals to be electrically connected in an outside of the module 1.

The holder 14 is assembled with a front wall of the housing 21 through a bush 16. The holder 14 assembles the sleeve cover 11, the sleeve 18, the stub 12, and the bush 19 through the joint sleeve 13. The joint sleeve 13 may optically align the root of the stub 12 with the optical devices in the body 20. That is, adjusting an overlap of the skirt of the joint sleeve 13 with the holder 14 performs the alignment along the optical axis, while, sliding the bush 19 with the stub 12 on an end surface of the joint sleeve 13 performs the alignment perpendicular to the optical axis. The holder 14 sets a collimating lens 15 therein to collimate light, exactly, the wavelength multiplexed signal, output from the tip end of the stub 12. This wavelength multiplexed signal reaches the optical component in the space through the window 17.

The housing 21 provides a support 23 on the bottom 22 thereof. The support 23 mounts the optical de-multiplexer 30 thereon that de-multiplexes the wavelength multiplexed signal collimated by the lens 15. The optical de-multiplexer 30 includes two sub-elements, 31 and 32, in the present embodiment shown in FIG. 1. The sub-elements, 31 and 32, protrude rear ends thereof from the edge of the support 23. As explained later, the independent signals de-multiplexed by the optical de-multiplexer 30 advance downward toward the bottom 22 of the housing 21 and enter the light-receiving devices 25, typically photodiodes mounted on the bottom 22 concentrated by lenses 24.

In the receiver optical module 1 of the present embodiment, the signals de-multiplexed by the first sub-elements 31 enter the first group of PDs 25b, while, the rest signals de-multiplexed by the second sub-elements 32 enter the second group of PDs 25a. The first group of the PDs 25b and the second group of the PDs 25a are arranged in an array, namely, in two rows.

The wavelength multiplexed signal output from the stub 12 enters the sub-element 31 along the optical axis of the stub 12 and the signals de-multiplexed by the sub-elements, 31 and 32, are output along the stacking direction of the sub-elements, 31 and 32. This arrangement of the sub-elements, 31 and 32, may save a footprint of the PDs 25 compared with an arrangement where an optical de-multiplexer, concentrating lenses, and PDs are assembled on a plane. The pre-amplifier 26 may be assembled close to the PDs 25 without enlarging the size of the housing 21.

Figure 2A:
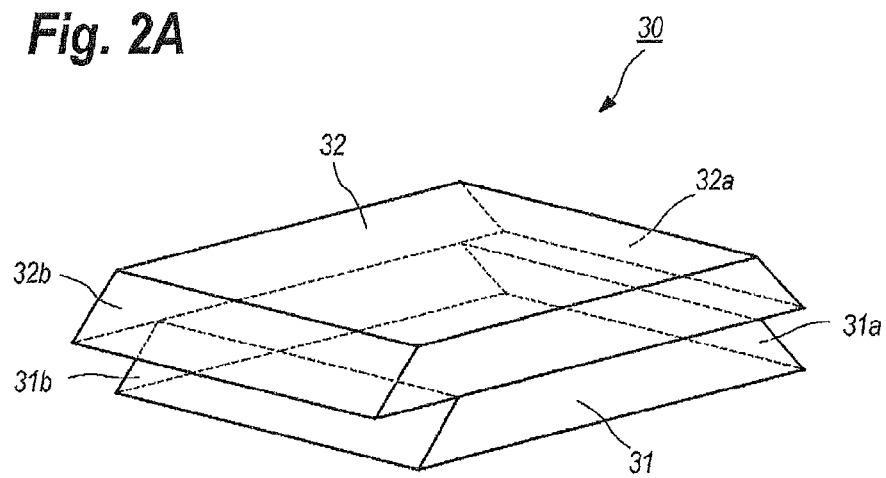
FIG. 2A is a perspective view of an optical de-multiplexer according to the first embodiment of the invention.
Figure 2B:
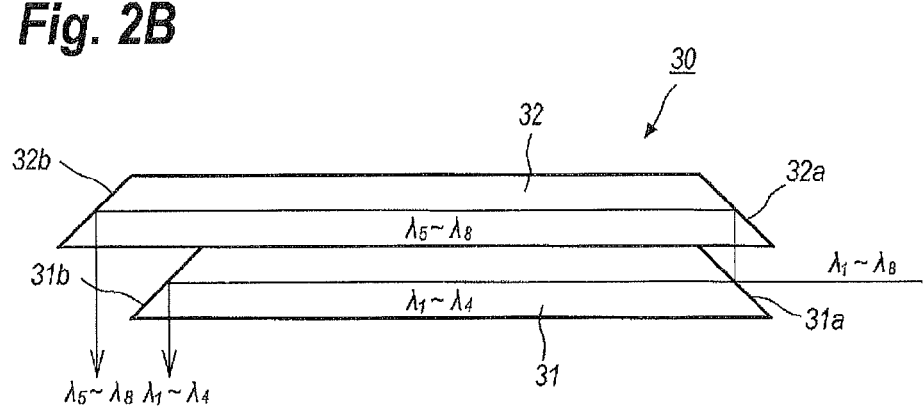
FIG. 2B is a side view of the optical de-multiplexer shown in FIG. 2A.

Next, examples of the optical de-multiplexer 30 installed in the receiver optical module 1 according to the present invention will be described. FIGS. 2A and 2B schematically illustrate the optical de-multiplexer 30 of the present embodiment, while, FIGS. 3A and 3B show transmittance of the WSFs implemented within the optical de-multiplexer 30.

The optical de-multiplexer 30 receives a wavelength multiplexed signal that contains a plurality of signal components each having respective wavelengths, $\lambda 1 \sim \lambda 8$, where we assume a relation of $\lambda 1 < \lambda 2 < \lambda 3 < \lambda 4 < \lambda 5 < \lambda 6 < \lambda 7 < \lambda 8$. The optical de-multiplexer 30 de-multiplexes the received wavelength multiplexed signal depending on the wavelengths. The optical de-multiplexer 30 of the present embodiment includes two sub-elements, 31 and 32. FIG. 2A is a perspective view, while, FIG. 2B is a side view of the optical de-multiplexer 30 stacking two sub-elements, 31 and 32. Each of the sub-elements, 31 and 32, has a trapezoid side cross section. In the description below, the first sub-element 31 is assumed to one first receives the wavelength multiplexed signal.

The first sub-element 31 recovers a portion of signal components of the wavelengths λ1~λ4, respectively; while, the other sub-element 32 recovers another portion of the signal components of the wavelengths λ5~λ8, respectively. Specifically, the first sub-element 31 provides an incident surface 31a inclined by 45° against the incoming direction of the wavelength multiplexed signal. A first WSF is put on the incident surface 31a.

Figure 3A:
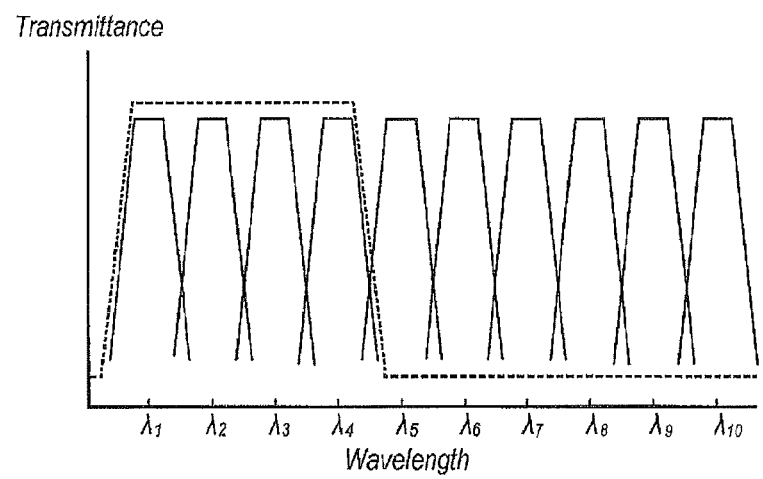
FIG. 3A schematically illustrates transmittance spectrum of a WSF provided in the incident surface of the optical de-multiplexer shown in FIG. 2A, and FIG. 3B schematically illustrates another transmittance spectrum of the WSF in the incident surface.
Figure 3B:
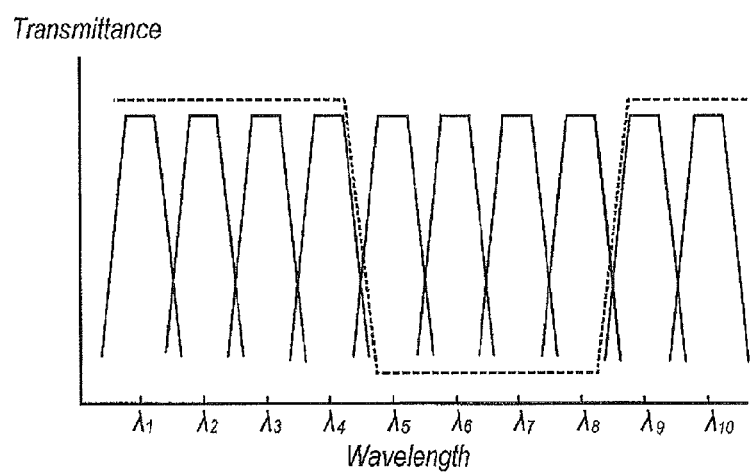

The WSF, as schematically illustrated in FIG. 3A, selectively transmits the signal components of λ1~λ4, but reflects rest of the signal components; namely, wavelengths shorter than λ1 and longer than λ4. Accordingly, the signal components of the wavelength multiplexed signal longer than λ4 are reflected toward the second sub-element 32 by the WSF.

The second sub-element 32 provides a surface 32a also inclined by 45° against the incoming direction of the portion of the wavelength multiplexed signal reflected at the WSF of the first sub-element 31. The surface 32a overlaps with the incident surface 31a of the first sub-element 31. The surface 32a of the second sub-element 32 also provides another WSF that selectively reflects the signal components of the wavelengths λ5~λ8, but transmits the signal components of the wavelengths shorter than λ5 and longer than λ8, whose typical transmittance is shown in FIG. 3B. Thus, the first sub-element 31 generates the signals of the wavelengths λ1~λ4; while, the other sub-element 32 generates other signal components of the wavelengths λ5~λ8.

The optical de-multiplexer 30 of the present embodiment includes a plurality of sub-elements each having the surface inclined by 45° with respect to the direction of the incoming light. Each of the surfaces in respective sub-elements provides a WSF that selects a portion of the signal components to guide them into the body of respective sub-elements. A feature of the present de-multiplexer 30 is that, respective signal components entering into respective bodies of the sub-elements have wavelengths different from those entering other bodies of the sub-elements. That is, the sub-elements generate respective portions of the wavelength multiplexed signal specific to the sub-elements and different from those for the other sub-elements.

The embodiment shown in FIGS. 2A and 2B provides the WSF in the second sub-element 32 that reflects the portion of the wavelength multiplexed signal attributed to wavelengths λ5~λ8. However, when the wavelength multiplexed signal entering the optical de-multiplexer 30 only contains the wavelengths λ1~λ8 and the first WSF of the first sub-element 31 selectively removes the wavelengths λ1~λ4; the WSF of the second sub-element 32 may be replaced to a mirror that reflects all of the wavelengths λ1~λ8. The first WSF of the first sub-element 31 substantially removes the wavelengths λ1~λ4, which means that the light reflected by the first WSF do not contain the wavelengths λ1~λ4. Accordingly, even when the second WSF of the second sub-element 32 is replaced to a mirror, the light reflected by this mirror and entering the body of the second sub-element 32 contains no wavelengths λ1~λ4. Moreover, although the embodiment thus described and shown in FIGS. 2A and 2B stacks only two sub-elements, 31 and 32, the optical de-multiplexer 30 may stack three or more sub-elements each having a WSF in the incident surface thereof to select the wavelengths specific to the sub-element and different from others. In such an arrangement, the WSF of the last sub-element, which is stacked on the top of the optical de-multiplexer 30, may be replaced to a mirror that reflects all wavelengths contained in the wavelength multiplexed signal entering the optical de-multiplexer 30.

Each of the sub-elements, 31 and 32, provides an output surfaces, 31b and 32b, inclined by 45° with respect to the incoming direction of the signals de-multiplexed by respective sub-elements, 31 and 32. Moreover, the output surfaces, 31b and 32b, provide respective mirrors. The portion of wavelength multiplexed signal having the wavelengths λ1~λ4 and entering the body of the first sub-element 31 is de-multiplexed into respective signals, and these signals having the wavelengths λ1~λ4 are reflected downward by the mirror provided in the output surface 31b. Similarly, the output surface 32b of the second sub-element 32 is inclined by 45° with respect to the axis of the incoming light and provides a mirror. The rest portion of the wavelength multiplexed signal having the wavelengths λ5~λ8 entering the body of the second sub-element 32 is de-multiplexed into respective signals of the wavelengths λ5~λ8. These signals are also reflected downward by the mirror provided in the output surface 32b.

Referring to FIG. 2A, the optical de-multiplexer 30 of the present embodiment sets the output surfaces, 31b and 32b, diagonally, namely, two output surfaces, 31b and 32b, are not overlapped by differentiating the longitudinal length of the body thereof. Specifically, the second sub-element 32 has the longitudinal length longer than that of the first sub-element 31. Accordingly, the signals output from the second sub-element 32 and reflected by the mirror of the second output surface 32b never intersect the signals reflected by the first mirror on the first output surface 31b.

Figure 4B:
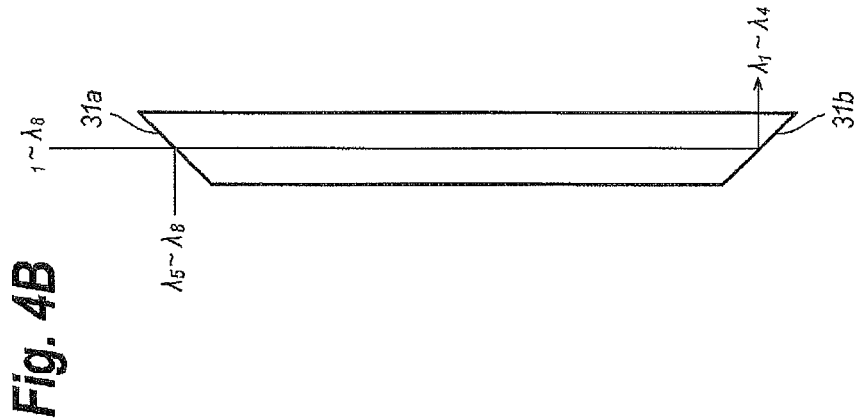
FIG. 4B is a side view thereof.
Figure 4A:
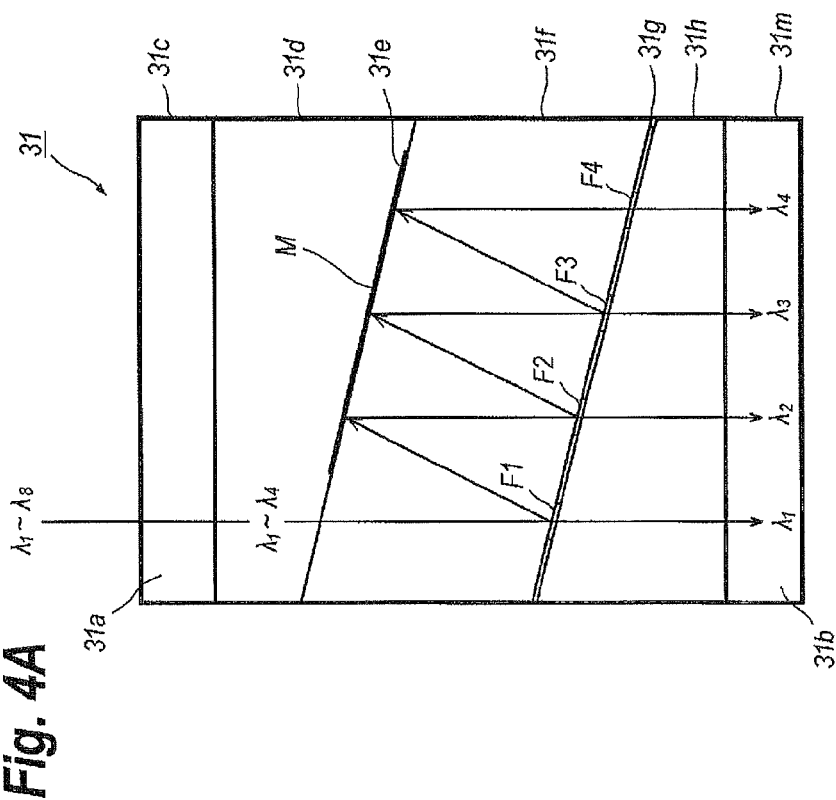
FIG. 4A schematically illustrates a plan view of a sub-element in the optical de-multiplexer according to an embodiment of the invention.

The body of the first sub-element 31 and that of the second sub-element 32 will be described in detail. FIGS. 4A and 4B schematically illustrate the sub-element 31. As shown in FIG. 4A, the first sub-element includes an input triangle 31c, an input trapezoid 31d, a parallelogram body 31f, an output trapezoid 31h, and an output triangle 31m. In addition, the first sub-element 31 provides a mirror M on the interface 31e between the input trapezoid 31d and the parallelogram body 31f, and WSFs, F1 to F4, in another interface 31g between the parallelogram body 31f and the output trapezoid 31h.

The input triangle 31c, which is put in the front end of the sub-element 31, provides the incident surface 31a inclined by 45° with respect to the wavelength multiplexed signal entering therein. As already described, the incident surface 31a provides the aforementioned WSF thereon. Referring to FIG. 4A, the WSF on the incident surface 31a is unnecessary to cover a whole surface 31a but is necessary to cover only an area through which the incoming wavelength multiplexed signal passes. The portion of the wavelength multiplexed signal transmitting the WSF provided on the surface 31a, where the embodiment passes the portion of signal components of the wavelengths λ1~λ4, advances toward the parallelogram body 31f through the input trapezoid 31d.

The portion of the wavelength multiplexed signal passing the parallelogram body 31f and reaching the first WSF F1 is processed thereat. That is, only the signal component of the wavelength λ1 transmits the WSF F1 but rest of signal components of the wavelengths λ2~λ4 are reflected by the WSF F1. The reflected signal components are reflected again by the mirror M on the interface 31e without any wavelength selection and go to the second WSF F2. The second WSF F2 only transmits one signal component of the wavelength λ2 and reflects the rest of the signal components of the wavelengths, λ3 and λ4. The reflected signal components are reflected again by the mirror M and reach the third WSF F3. The third WSF F3 only transmits the third signal component of the wavelength λ3 but reflects the signal component of the wavelength λ4. This reflected component is reflected again by the mirror M, reaches the fourth WSF F4 and transmits the WSF F4.

Respective signal components each transmitting the WSFs, F1 to F4, go to the output triangle 31m through the output trapezoid 31h, and reflected by the output surface 31b downward. Thus, the sub-element 31 may extract the signals of the wavelengths λ1~λ4 as iterating the transmission of respective WSFs, F1 to F4, and the reflection by the mirror M.

The second sub-element 32 has an arrangement similar to those of the first sub-element 31 except for the input and/or the output trapezoid, 31d and 31 h, in order to extend the longitudinal length thereof. Also, the second sub-element 32 replaces the WSFs, F1 to F4, into other WSFs, F5 to F8, to transmit other signal components of the wavelengths λ5~λ8.

Thus, the optical de-multiplexer 30 according to the present embodiment stacks a plurality of the sub-elements each de-multiplexing the portion of the wavelength multiplexed signal. Respective portions are simply discriminated by the WSFs each provided in the input surfaces of the sub-elements, which may make the optical de-multiplexer 30 in compact. Moreover, the de-multiplexed signals are output from respective output surfaces downward, or the stacking direction of the sub-elements, without intersecting to each other. This arrangement of the wavelength de-multiplexed signals may not only shorten the difference between respective signals in the optical distances from the collimating lens 15 to respective PDs 25, but make the disposition of the PDs 25 in compact.

(First Modification)

Figure 5A:
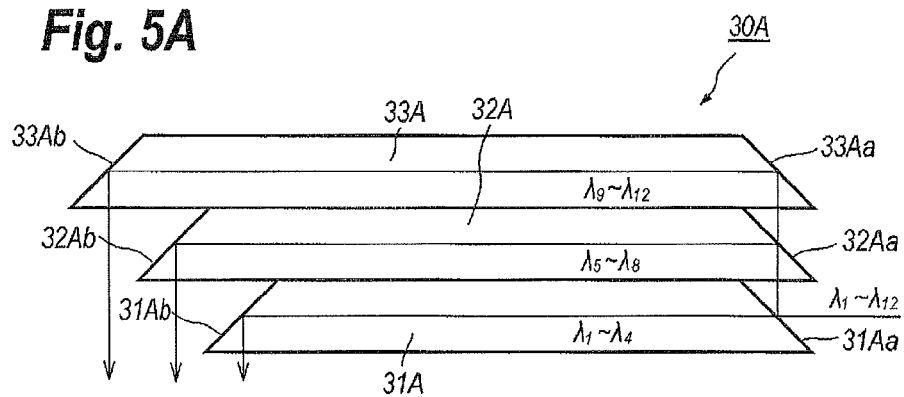
FIG. 5A schematically illustrates a modification of the optical de-multiplexer involving three sub-elements.

FIG. 5A schematically illustrates an optical de-multiplexer 30A modified from the aforementioned optical de-multiplexer 30. The optical de-multiplexer 30A shown in FIG. 5A may de-multiplex a wavelength multiplexed signal containing twelve (12) signal components of wavelengths λ1~λ12, where λ1 is the shortest, λ12 is the longest, and λ2~λ11 are arranged in this order. The optical de-multiplexer 30A includes three independent sub-elements, 31A to 33A, stacked to each other. The first sub-element 31A de-multiplexes a first portion of the wavelength multiplexed signal containing signal components of the wavelengths λ1~λ4 where the incident surface 31Aa thereof provides the first WSF that transmits signal components of the wavelengths λ1~λ4 but reflects the rest of the signal components of the wavelengths λ5~λ12. The second sub-element 32A, which is stacked on the first sub-element 31A, de-multiplexes another portion of the wavelength multiplexed signal reflected by the first WSF of the first sub-element 31A. Therefore, the incident surface 32Aa of the second sub-element 32A provides the second WSF that reflects signal components of the wavelengths λ5~λ8 toward the body of the second sub-element 32A but transmits the rest of the signal components of the wavelengths λ9~λ12. The third sub-element 33A, which is stacked on the second sub-element 32A, de-multiplexes the rest portion of the wavelength multiplexed signal reflected by the second WSF of the second sub-element 32A. The rest portion of the wavelength multiplexed signal contains the signal components of the wavelengths λ9~λ12. Accordingly, the incident surface 33Aa of the third sub-element 33A provides another WSF that reflects the wavelengths λ9~λ12. However, as already described, the last WSF provided on the incident surface 33Aa of the third sub-element 33A may be replaced to a mirror that reflects not only the wavelengths λ9~λ12 but substantially whole wavelengths under consideration.

Figure 5B:
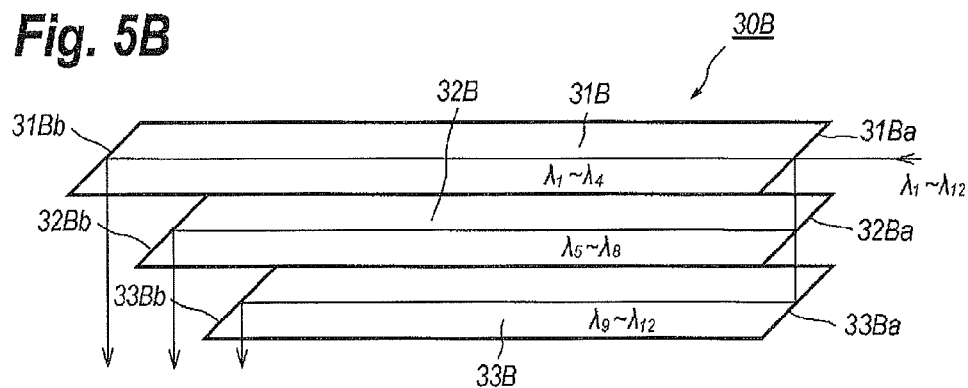
FIG. 5B illustrates still another modification of the optical de-multiplexer also including three sub-elements.

FIG. 5B schematically illustrates still another modification of the optical de-multiplexer that includes three sub-elements, 31B, 32B, and 33B, stacked to each other. The optical de-multiplexer 30B may also de-multiplex the wavelength multiplexed signal containing signal components of the wavelengths λ1~λ12. The optical de-multiplexer 30B has a feature distinguishable from those aforementioned devices, 30 and 30A, that the first sub-element 31B which first receives the wavelength multiplexed signal is stacked in topmost.

Specifically, the first sub-element 31B stacked on the top firstly receives the wavelength multiplexed signal, while, the third sub-element 33B set in the lowest stack receives the rest of the signal components not extracted by the first WSF on the first surface 31Ba and the second WSF on the second incident surface 32Ba. Even in this alternative arrangement, respective sub-elements, 31B to 33B, each provides the WSF set on the incident surface, 31Ba to 33Ba, to selectively extract the signal components specific to the sub-element, namely, wavelengths able to be de-multiplexed by the sub-element, and exclude other signal components not subject to the sub-element.

(Second Embodiment)

Figure 6A:
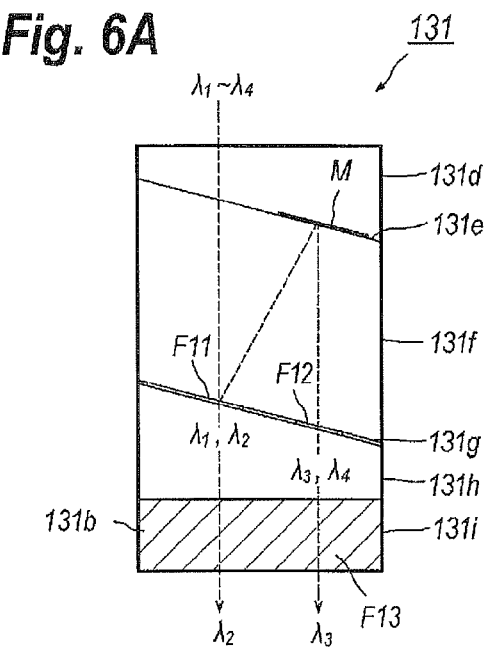
FIG. 6A schematically illustrates a plan view of a sub-element according to the second embodiment of the invention.
Figure 6B:
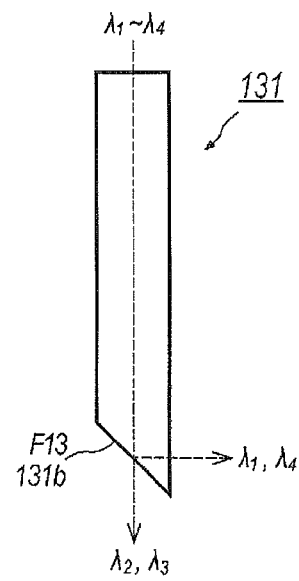
FIG. 6B is a side view thereof.

Next, another type of the sub-element in the optical de-multiplexer 30 will be described. FIG. 6A schematically illustrates a plan view of another type of the sub-element 131; while, FIG. 6B is a side view thereof. The sub-element 131, similar to the aforementioned sub-element 31, may de-multiplex the wavelength multiplexed signal containing signal components of the wavelengths λ1~λ4, where λ1 is the shortest and λ4 is the longest. The sub-element 131 comprises an input trapezoid 131d, a parallelogram body 131f, an output trapezoid 131h, and an output triangle 131i. A mirror M is put on an interface 131e between the input trapezoid 131d and the parallelogram body 131f, while, WSFs are put on the interface 131g between the parallelogram body 131f and the output trapezoid 131h.

Figure 6C:
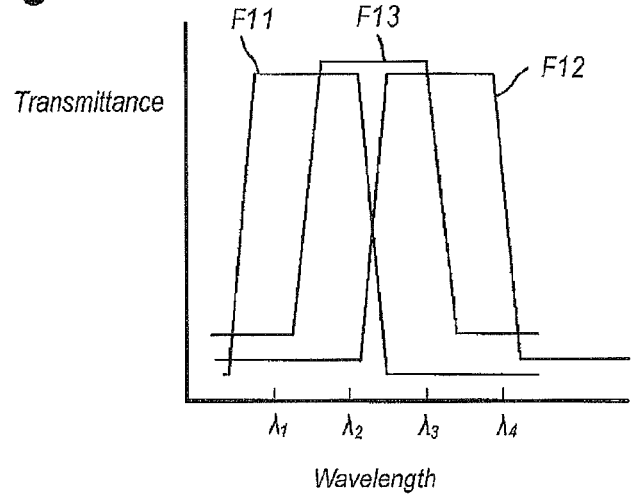
FIG. 6C shows transmittance of three WSFs involved in the sub-element shown in FIG. 6A.

The interface 131g includes two filters, F11 and F12. A feature of the sub-element 131 of the present embodiment is that the input surface 131a has no WSF but the output surface 131b provides the third WSF F13. FIG. 6C schematically shows the transmittance of respective WSFs, F11 to F13. Specifically, the first WSF F11 selectively transmits signal components of the wavelengths λ1 and λ2 but reflects the rest of the signal components of the wavelengths λ3 and λ4. The second WSF F12 selectively transmits the signal components of the wavelengths λ3 and λ4 but reflects other wavelengths. However, the wavelength multiplexed signal incoming the sub-element 131 only includes the signal components of the wavelengths λ1 to λ4, which means that the optical signal reaching the second wavelength filter F12 only include wavelengths λ3 and λ4; accordingly, the second WSF may be removed. The second feature of the sub-element 131 is that the output surface 131i provides the third WSF F13 that selectively transmits the signal components of the wavelengths λ2 and λ3, but reflects the other wavelengths λ1 and λ4. Accordingly, as schematically shown in FIG. 6A, the signals of the wavelengths λ2 and λ3 transmit through the output surface 131b but the lateral locations thereof are different from the other as shown in FIG. 6A; while, the signal components of the wavelengths λ1 and λ4 are bent by 90° at the output surface 131b but the lateral locations thereof are also different from the other. Thus, respective signals appear respective locations different from others and the wavelength multiplexed signal entering the sub-element 131 is effectively de-multiplexed.

The optical de-multiplexer 131 will be further described. As already explained, the optical de-multiplexer 131 includes the input trapezoid 131*d*, the parallelogram sub-body 131*f*, the output trapezoid 131*h* and the output triangle 131*i*. The input trapezoid 131*d* and the parallelogram body 131*f* provide the mirror M on the interface 131*e* therebetween; while, the WSFs, F11 and F12, are provided on the interface 131*g* between the parallelogram body 131*f* and the output trapezoid 131*h*. The interfaces, 131*e* and 131*g*, are inclined with respect to the optical axis of the incoming wavelength multiplexed signal.

Although the embodiment provides the output triangle 131*i*, the sub-element 131 may provide an output rectangle that comprises two triangles, or prisms, hypotenuses of which are attached to the other. The third WSF F13 is unnecessary to cover the whole surface 131*b* of the output triangle 131*i*. The third WSF F13 may cover only portions where the de-multiplexed signals of the wavelengths λ2 and λ3 transmit toward the PDs 25 set in downstream of the sub-element 131.

Thus, the sub-element 131 of the present embodiment may de-multiplex the wavelength multiplexed signal that contains two groups of the signal components, one of which contains two signal components of the wavelengths λi and λi+1 adjacent to each other; while, the other group also contains two signal components of the wavelengths λj and λj+1 adjacent to each other but different from those in the first group. The sub-element 131, as receiving such a wavelength multiplexed signal, first divides the wavelength multiplexed signal entering the sub-element 131 into two groups of the signal components by the first group of the WSFs, F11 and F12, each transmitting one of the groups of the signal components and reflecting the other of the groups. Each of the signal groups appears in respective locations different from the other. The sub-element 131 next filters the signal components in the first and second signal groups such that one signal component of the longest wavelength λi+1 in the first signal group and one signal component in the second signal group having the shortest wavelength λj are reflected by or transmitted through the WSF on the output surface 131*b*; while, the rest of the signal components in the first signal group of the shortest wavelength λi and the rest of the signal components in the second signal group having the longest wavelength λj+1 are transmitted through or reflected by the WSF on the output surface 131*b*. The WSF on the output surface 131*b* is called as the second group of the WSF. Thus, the sub-element 131 may spatially separate the signals of the wavelengths, λi, λi+1, λj, and λj+1.

Some applications sometimes restrict the total height of a receiver optical module 1. In such a case, the optical de-multiplexer 30 in the first embodiment that stacks several sub-elements vertically would be unpractical. The optical de-multiplexer of the second embodiment that restricts the total height thereof by elongating the total length along the longitudinal direction may be one of solutions for such applications.

Figure 7B:
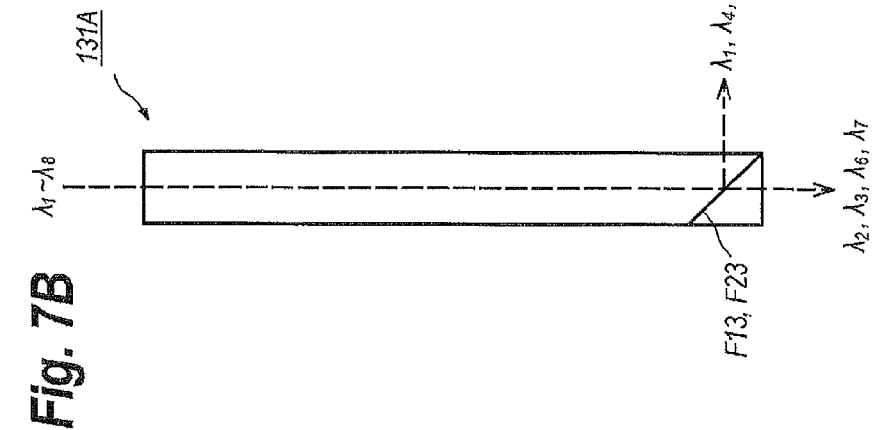
FIG. 7B is a side view thereof.
Figure 7A:
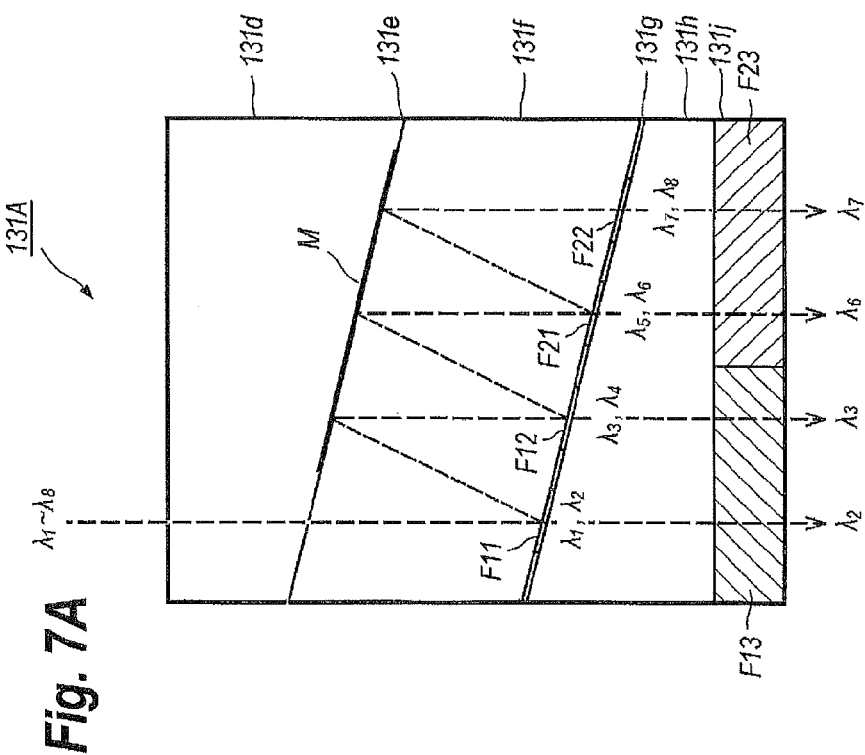
FIG. 7A is a plan view of a modification of the sub-element shown in FIG. 6A.

FIGS. 7A and 7B schematically illustrate a modification of the sub-element 131 of the second embodiment of the present application, where FIG. 7A is a plan view, while, FIG. 7B is a side view of the modified sub-element 131A. The present sub-element 131A may de-multiplex a wavelength multiplexed signal containing signal components of the wavelengths λ1 to λ8, where λ1 the shortest and λ8 the longest, into respective signals.

The sub-element 131A may be regarded as a device arranging the aforementioned sub-element 131 in side by side. That is, the sub-element 131A includes the WSFs, F11 to F13, that de-multiplex the first group of the signal components of the wavelengths λ1 to λ4; and the other WSFs, F21 to F23 that de-multiplex the second group of the signal components of the wavelengths λ5 to λ8. The function of the WSFs, F11 to F13, are same as those of the aforementioned sub-element 131 shown in FIGS. 6A to 6C. The function of the second group of the WSFs, F21 to F23, is also same with those of the sub-element 131. The WSFS, F11, F12, F21 and F22 are included in the first group of WSFs, while, the WSFs, F13 and F23, are included in the second group of WSFs.

Specifically, the second WSF F12 transmits the signal components of the wavelengths λ3 and λ4 but reflects the signal components of the wavelengths λ5 to λ8, where the wavelength λ5 is the shortest and λ8 is the longest. The signal components, which are reflected by the second WSF F12 toward the mirror M and reflected again by the mirror M toward the fourth WSF F21, reaches the fourth WSF F21. The fourth WSF F21 transmits two signal components of the shorter wavelengths λ5 and λ6 but reflects two signal components of the longer wavelengths λ7 and λ8. The latter two signal components are reflected again by the mirror M toward the fifth WSF F22 that transmits these two signal components. The signal components of the wavelengths λ5 to λ8 reach the sixth WSF F23. The sixth WSF F23 has the transmittance large enough for the signal components of the wavelengths λ6 and λ7 but small enough except for these two wavelengths.

Accordingly, the signal components of the wavelengths λ5 and λ8, the former is transmitted through the fourth WSF F21, while the latter is transmitted through the fifth WSF F22, are almost fully reflected downward, and the signal components of the wavelengths λ6 and λ7 almost fully transmit the six WSF F23. Thus, the WSFs, F21 to F23, performs the function same with those of the WSFs, F11 to F13, that is, the WSFs, F21 to F23, may output the signal components of the wavelengths λ5 to λ8, which are contained in the second group of the wavelength multiplexed signal, in respective locations of the sub-element 131A, exactly, the output triangle 131*j* different from others. Accordingly, the sub-element 131A may de-multiplex the wavelength multiplexed signal by the arrangement without extending the total height of the receiver optical module 1. The WSFs, F11, F12, F21 and F22, belong to the first group provided on the interface 131*g*, while, the WSFs, F13 and F23, belong to the second group provided in the output triangle 131*j*.

Although the aforementioned sub-element 131 explicitly provides the output triangle 131*i* whose hypotenuse provides the WSF F13, the present sub-element 131A explicitly includes the output rectangle 131*j* that attaches two triangles, or two prisms, as facing their hypotenuse. Two WSFs, F13 and F23, are set on the interface between two triangles. The interface makes an angle of 45° with respect to the optical axes of the signals each transmitting through respective WSFs F11, F12, F21, and F22. As already explained, the WSFs, F13 and F23, are unnecessary to cover whole of the interface. Two WSFs, F13 and F23, may only cover portions where the signal components of the wavelengths λ1 to λ8 output.

FIGS. 8A and 8B schematically illustrate still another sub-element to perform the optical de-multiplexing. The present sub-element 131B adds an output triangle 131*m* to those in the former embodiment 131A to reflect the signal components transmitting through the WSFs, F13 and F23. Because the rectangle 131*m* has the hypotenuse with an angle of 45° with respect to the optical axes of the signal components transmitting through the WSFs, F13 and F23, these signal components are reflected thereat and advance substantially in parallel to the signal components reflected by the WSFs, F13 and F23. Accordingly, the PDs set in the downstream of the sub-element 131B may be arranged in the array, in the present embodiment. The PDs may be arranged in two rows.

Figure 9A:
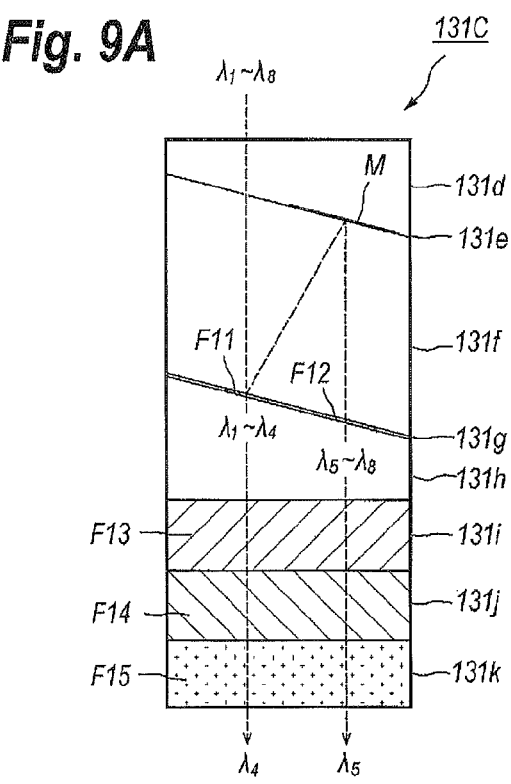
FIG. 9A schematically illustrates still another modification of the sub-element shown in FIG. 6A.
Figure 9B:
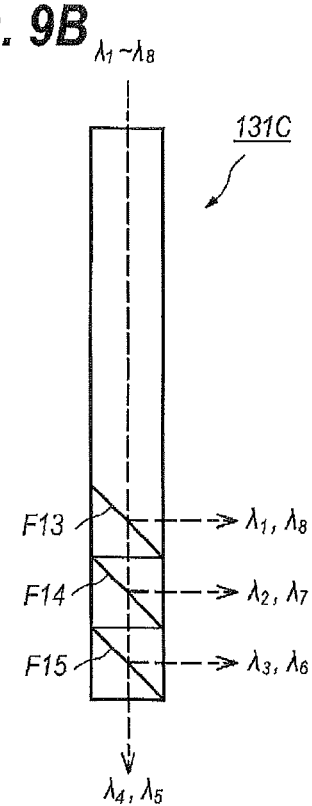
FIG. 9B is a side view thereof.

FIGS. 9A and 9B illustrate still another modification of the sub-element 131, where FIG. 9A is a plan view and FIG. 9B is a side view of the sub-element 131C of the present modification. As illustrated, the sub-element 131C may de-multiplex the wavelength multiplexed signal containing signal components of the wavelengths of $\lambda 1$ to $\lambda 8$. The sub-element 131C includes five (5) WSFs, F11 to F15, and the mirror M. Further, the sub-element 131C, in addition to those in the aforementioned sub-element 131, includes three output rectangles, 131i to 131k, each of which is composed of two triangles attaching respective hypotenuses to each other to form the interface inclined by 45° with respect to the optical axes of the incoming signal components. The interfaces in respective rectangles, 131i to 131k, provide respective WSFs, F13 to F15.

The first WSF F11 divides the signal components contained in the wavelength multiplexed signal into two groups, one of which includes signal components having shorter four wavelengths, $\lambda 1$ to $\lambda 4$, another of which includes signal components with longer four wavelengths, $\lambda 5$ to $\lambda 8$, by transmitting the former group and reflecting the latter group. The latter group is reflected by the mirror M toward the second WSF F12 and transmits therethrough. Thus, both signal groups go toward the output rectangles, 131i to 131k.

Figure 9C:
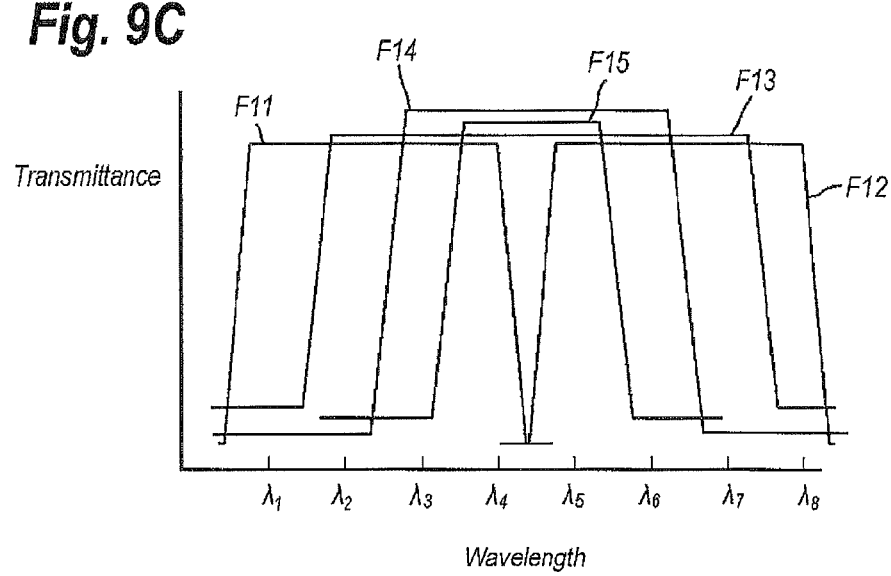
FIG. 9C illustrates transmittance spectrum of WSFs involved in the sub-element shown in FIG. 9A.
Figure 10B:
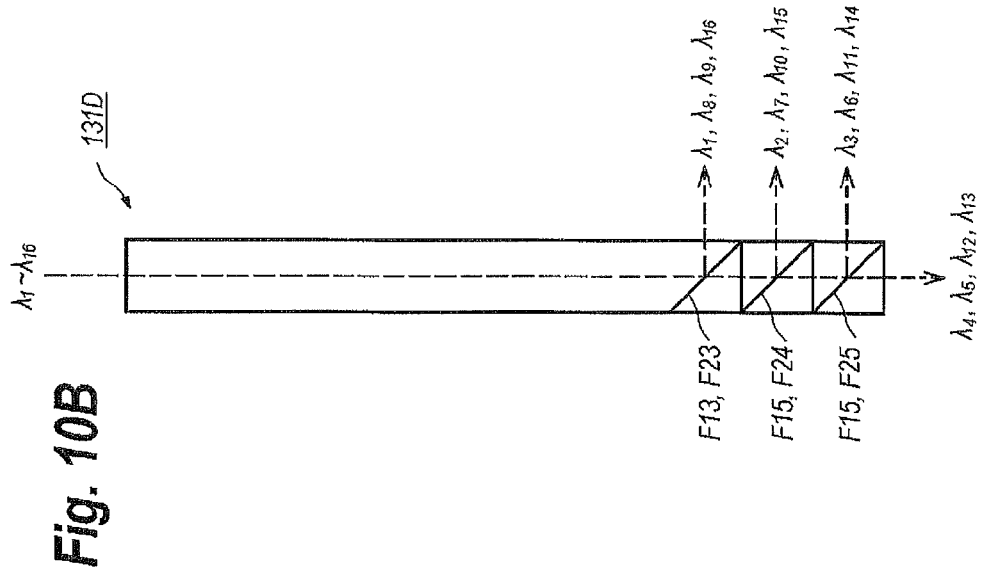
FIG. 10B is a side view thereof.
Figure 10A:
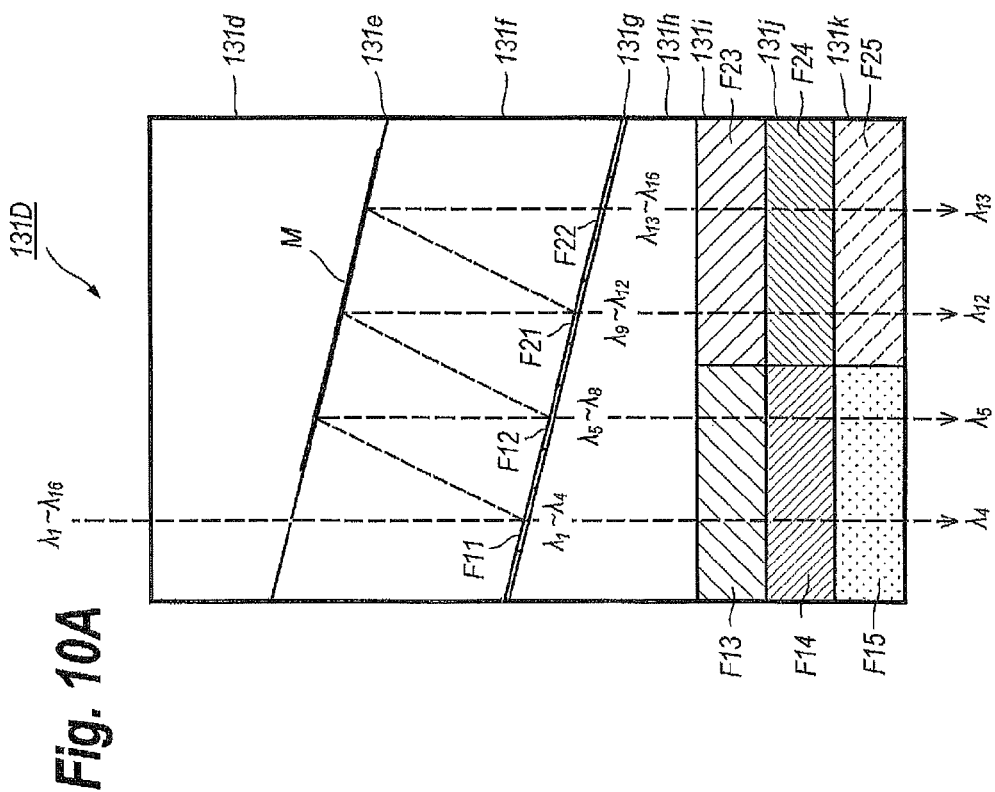
FIG. 10A is a plan view of still another modification of the sub-element shown in FIG. 9A.

FIG. 9C schematically shows the transmittance of the WSFs implemented within the sub-element 131C. As described, two WSFs, F11 and F12, divide the incoming wavelength multiplexed signal into two groups, one of which includes the shorter four wavelengths, $\lambda 1$ to $\lambda 4$; while, the other includes the longer four wavelengths, $\lambda 5$ to $\lambda 8$. The WSF F13 in the first output rectangle 131i may transmit the signal components having center six wavelengths, $\lambda 2$ to $\lambda 7$, while, the WSF F13 reflects the signal components having outermost two wavelengths, $\lambda 1$ and $\lambda 8$. The next WSF F14 transmits the signal components having center four wavelengths, $\lambda 3$ to $\lambda 6$, but reflects the signal components having outermost two wavelengths, $\lambda 2$ and $\lambda 7$. The last WSF F15, similar to those of aforementioned WSFs, F13 and F14, transmits the signal components having center two wavelengths, $\lambda 4$ and $\lambda 5$, but reflects the signal components having outermost two wavelengths, $\lambda 3$ and $\lambda 6$.

Thus, the signal components of the wavelengths, $\lambda 1$ and $\lambda 8$, are output from the first output rectangle 131i, those of the wavelengths, $\lambda 2$ and $\lambda 7$, are output from the second rectangle 131j, those of the wavelengths, $\lambda 3$ and $\lambda 6$, are output from the third output rectangle 131k toward the direction in parallel to the former four signal components, and those of the wavelengths, $\lambda 4$ and $\lambda 5$, are output also from the third output rectangle 131k but from the surface perpendicular to the surface through which the signal components of the wavelengths, $\lambda 3$ and $\lambda 6$, are output. The sub-element 131C, similar to the aforementioned sub-element 131B in FIGS. 9A and 9B, may add another output triangle in the downstream of the third output rectangle 131k to reflect the signal components with center two wavelengths, $\lambda 4$ and $\lambda 5$, to reflect them toward the direction in parallel to those of the other signal components.

The sub-element 131C of the present embodiment may effectively de-multiplex the wavelength multiplexed signal, although the physical width thereof reduces almost half of the aforementioned sub-element shown in FIG. 8A but the longitudinal length thereof is slightly expanded. Moreover, the sub-element 131C does not enlarge the thickness thereof or stack other sub-elements to increase the signal components to be de-multiplexed. When the receiver optical module 1 has limited spaces in the lateral direction and/or the height thereof but provides a slight room along the longitudinal direction, the sub-element 131C of the present embodiment may be effectively applicable.

The sub-element 131D may de-multiplex the wavelength multiplexed signal containing sixteen (16) signal components of the wavelengths, $\lambda 1$ to $\lambda 16$, where $\lambda 1$ is the shortest and $\lambda 16$ is the longest. The sub-element 131D assembles two sub-elements 131C each having the configuration of FIG. 9A. That is, the sub-element 131D provides the first to fifth WSFs, F11 to F15, to get the signal components of the wavelengths of $\lambda 1$ to $\lambda 8$ and the other five WSFs, F21 to F25, to get the signal components of the wavelengths of $\lambda 9$ to $\lambda 16$.

Specifically, the sixth WSF F21 selectively transmits the signal components of the wavelengths, $\lambda 9$ to $\lambda 12$, while reflects rest signal components. The seventh WSF F22 selectively transmits the signal components of the wavelengths $\lambda 13$ to $\lambda 16$. The eighth WSF F23 provided in the downstream of the output trapezoid 131h selectively transmits the signal components having center six wavelengths, $\lambda 10$ to $\lambda 15$, but reflects the signal components having the outermost wavelengths, $\lambda 9$ and $\lambda 16$. The ninth WSF F24 provided in the rectangle 131j in the downstream of the former rectangle 131i selectively transmits the signal components having the center four wavelengths, $\lambda 11$ to $\lambda 14$, but reflects the signal components having the outermost wavelengths, $\lambda 10$ and $\lambda 15$. Finally, the last WSF F25 provided in the rectangle 131k in the downstream of the former rectangle 131j selectively transmits the signal components with the center wavelengths, $\lambda 12$ and $\lambda 13$, and reflects the signal components with the outermost wavelengths, $\lambda 11$ and $\lambda 14$.

The signal components having the shorter eight wavelengths, $\lambda 1$ to $\lambda 8$, in the wavelength multiplexed signal entering the sub-element 131D may be de-multiplexed by the same manner with the aforementioned sub-element 131C. But a portion of the wavelength multiplexed signal reflected by the second WSF 12 advances the mirror M and reflected again by the mirror M toward the sixth WSF 21, and subsequently de-multiplexed according to the manner described above.

Thus, the wavelength multiplexed signal entering the sub-element 131D, which has the 16 signal components of the wavelengths, $\lambda 1$ to $\lambda 16$, may be effectively de-multiplexed by the sub-element 131D. Four signal components of the wavelengths, $\lambda 1$, $\lambda 8$, $\lambda 9$ and $\lambda 16$, where they are the signal components of the outermost wavelengths of the shorter half group and the longer half group, respectively, are output from the first rectangle 131i in locations different from each other; the four signal components of the wavelengths, $\lambda 2$, $\lambda 7$, $\lambda 10$, and $\lambda 15$, where they are the next outermost wavelengths of the shorter and longer half groups in the signal components, respectively, are output from the second output rectangle sub-element 131j in locations different from others; the four signal components of the wavelengths, $\lambda 3$, $\lambda 6$, $\lambda 11$, and $\lambda 14$, where they are the next outermost wavelengths of the shorter and longer half groups in the signal components, respectively, are output from the third output rectangle 131k in locations different from each other; and the rest four signal components of the wavelengths, $\lambda 4$, $\lambda 5$, $\lambda 12$, and $\lambda 13$, where they are the center wavelengths in the shorter and longer half groups of the signal components, respectively, are output also from the third output rectangle 131k in locations different from others but toward the direction substantially perpendicular to the former four wavelengths, λ3, λ6, λ11, and λ14. Thus, all signal components may be spatially discriminated.

The three output rectangles, 131i to 131k, each assembles two triangles as attaching the hypotenuses thereof to the other; and the respective interface between two triangles provide the WSFs, F13 to F15, and F23 to F25. The interfaces are inclined by substantially 45° with respect to the optical axis of the incident optical beams. Here, the WSFs, F11, F12, F21, and F22, belong to the first WSF group; the WSFs, F13 and F23, belong to the second WSF group; the WSFs, F14 and F24, belong to the third WSF group; and the WSFs, F15 and F25, belong to the fourth WSF group.

Figure 11B:
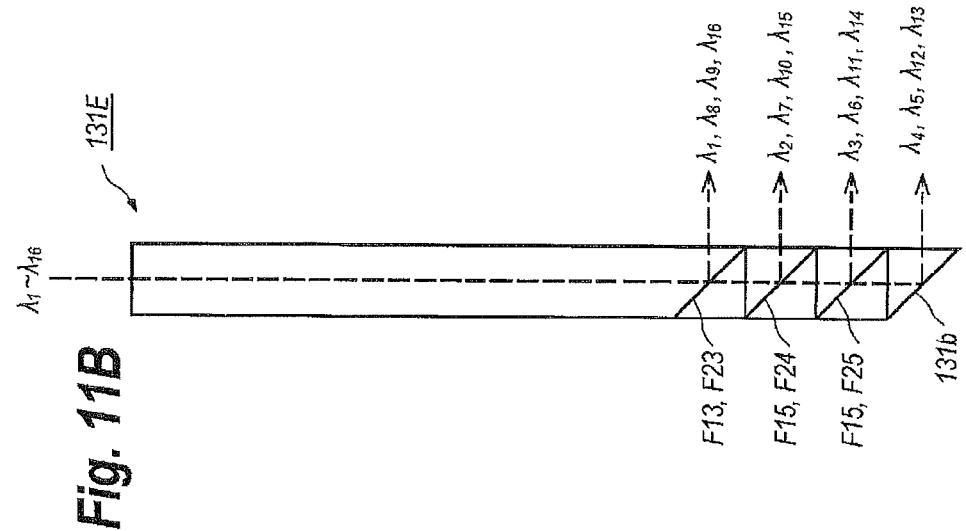
FIG. 11B is a side view thereof.
Figure 11A:
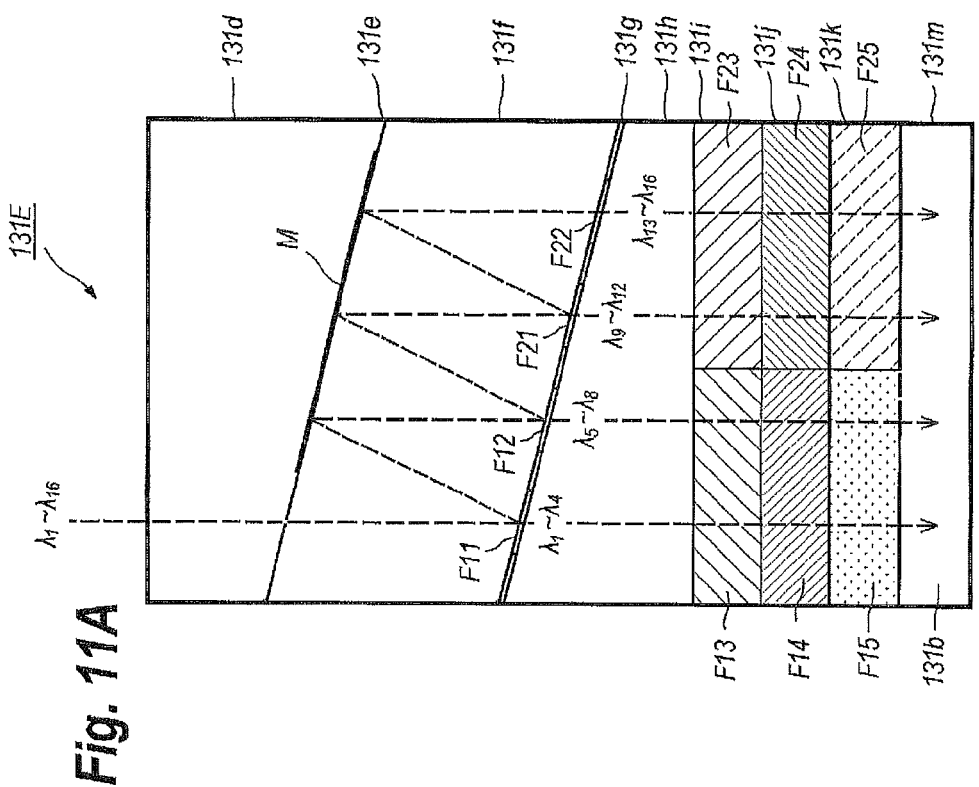
FIG. 11A is a plan view of a modification of the sub-element shown in FIG. 10A

FIGS. 11A and 11B schematically illustrate still another example of the sub-element having the function of the wavelength de-multiplexing. The sub-element 131E shown in FIGS. 11A and 11B are modified from that 131D of the aforementioned example. The sub-element 131E, similar to the former sub-element 131D, may de-multiplex the wavelength multiplexed signal containing 16 signal components each waving wavelengths, λ1 to λ16. A distinguishable feature of the sub-element 131E compared with the former sub-element 131D is that the present sub-element 131E adds the output triangle 131m to bend the optical axes of the signal components of the wavelengths, λ4, λ5, λ12, and λ13, transmitting through the WSFs, F15 and F25. Accordingly, all signal components of the wavelengths, λ1 to λ16, go substantially in parallel to each other. In this case, the PDs 25 may be arranged in four rows on the bottom of the housing as facing the light-sensitive surfaces thereof upward.

The sub-element of the present embodiment having the function of the wavelength de-multiplexing is generally explained. The sub-element of the present invention receives the wavelength multiplexed signal containing n-counts of signal components having respective wavelengths, where n is an integer. The sub-element includes:

(1) the initial group of the WSFs outputs (n/m)-counts of partial wavelength multiplexed signals in locations different from others, where each of the partial wavelength multiplexed signals contain m-counts of signal components of respective wavelengths, where m is an integer less than n (m<n) and preferably an aliquot of n; and (2) the $(i)_{th}$ ($1=<i<=(m/2)$) group of the WSFs, which receives (n/m)-counts of partial wavelength multiplexed signals output from the $(i-1)_{th}$ group of the WSFs, where the partial wavelength multiplexed signals each contains (m−2i+2)-counts of signal components, outputs the signal components of the shortest and the longest wavelengths among (m−2i+2)-counts of signal components toward the first direction and the rest (m−2i)-counts of the signal components toward the $(i+1)_{th}$ group of the WSFs whose direction is different from the first direction.

The first direction is preferably perpendicular to the direction connecting the $(i)_{th}$ group of the WSFs and the $(i+1)_{th}$ group of the WSFs. Moreover, the PDs, whose counts is 2×(n/m), are arranged in the first direction. Thus, when the signal components output from the last group, namely $(m/2)_{th}$ group of the WSFs, whose counts is 2×n/m, are reflected toward the first direction by a mirror, the PDs whose count is n may be arranged in the array of (m/2)×(2n/m).

In an alternative, the $(i)_{th}$ group of the WSFs, which receives the n/m partial wavelength multiplexed signals output from the $(i-1)_{th}$ group of the WSFs each containing (m−i+1)-counts of the signal components, outputs at least one signal component for the PD arranged toward the first direction and the rest of the signal components whose number is m−i toward the $(i+1)_{th}$ group of the WSFs arranged in the second direction perpendicular to the first direction. The (n/m)-counts of the PDs may be arranged in the first direction to receive the (n/m)-counts of the signal components reflected by the $(i)_{th}$ group of the WSFs. Thus, when the signal components output from the last group of the WSFs, namely the $(m)_{th}$ group of the WSFs, are reflected by a mirror toward the first direction; the PDs may be arranged in the array of (n/m)×m.

What is claimed is:

1. A receiver optical module for receiving a wavelength multiplexed signal containing a plurality of signal components each having a wavelength specific thereto and different from the others, comprising:
    an optical de-multiplexer that de-multiplexes the wavelength multiplexed signal, the optical de-multiplexer including sub-elements stacked to each other, the sub-elements each having an input surface, a body, and an output surface, the input surface providing a wavelength selective filter (WSF) belonging to a first group and the body providing a plurality of WSFs belonging to a second group; and
    photodiodes (PDs) that receive signal components independently,
    wherein the signal components contained in the wavelength multiplexed signal are spilt by the first group of the WSFs to respective bodies,
    wherein respective signal components split by the first group of the WSFs are de-multiplexed by the second group of the WSFs, and
    wherein the output surfaces have respective mirrors that reflect the signal components de-multiplexed by the second group of WSFs toward a stacking direction of the sub-elements.

2. The receiver optical module of claim 1,
    wherein one of the WSFs in the first group provided in one of the sub-elements that first receives the wavelength multiplexed signal transmits a portion of the signal components toward the body of the one of the sub-elements, and reflects a rest portion of the signal components toward the rest of the sub-elements, and
    wherein the rest of the WSFs in the first group provided in the rest of the sub-elements each reflects a respective portion of the signal components toward the body of a respective one of the rest of the sub-elements.

3. The receiver optical module of claim 1,
    wherein the input surfaces of respective sub-elements are overlapped in the stacking direction.

4. The receiver optical module of claim 3,
    wherein the output surfaces of respective sub-elements are diagonally arranged relative to the stacking direction.

5. The receiver optical module of claim 4,
    wherein the bodies of respective sub-elements each includes an input trapezoid, a parallelogram block, and an output trapezoid, the input trapezoid and the parallelogram block providing an interface providing a mirror, the parallelogram block and the output trapezoid providing another interface providing the WSFs in the second group, the interface and the another interface being inclined with an optical axis of the portion of the signal components split by the WSFs in the first group and entering the body, and wherein at least one of the input trapezoid and the output trapezoid of respective bodies has a longitudinal length gradually increasing as the stack of the sub-elements increases.

6. The receiver optical module of claim 4,
wherein each of the bodies further includes an input triangle providing the input surface and an output triangle providing the output surface.

7. The receiver optical module of claim 1,
wherein the PDs are arranged in an array of n×m, where n is a number of the stack of the sub-elements, and m is a number of the signal components de-multiplexed by the WSFs in the second group in respective sub-elements.

* * * * *